United States Patent [19]

Ogawa et al.

[11] Patent Number: 5,720,691
[45] Date of Patent: Feb. 24, 1998

[54] HYDRAULIC CONTROL APPARATUS FOR CONTINUOUSLY VARIABLE TRANSMISSION

[75] Inventors: Hiroshi Ogawa, Fuchu; Keiji Sato, Musashino, both of Japan

[73] Assignee: Fuji Jukogyo Kabushiki Kaisha, Tokyo, Japan

[21] Appl. No.: 613,745

[22] Filed: Feb. 22, 1996

[30] Foreign Application Priority Data

Mar. 14, 1995 [JP] Japan ................................. 7-054721

[51] Int. Cl.$^6$ ................................................... F16H 31/06
[52] U.S. Cl. ........................... 477/45; 477/48; 474/28
[58] Field of Search ................................. 477/45, 46, 47, 477/48; 474/18, 28

[56] References Cited

U.S. PATENT DOCUMENTS

| | | | |
|---|---|---|---|
| 4,685,357 | 8/1987 | Sawada et al. | 477/45 X |
| 4,798,561 | 1/1989 | Hattori et al. | 477/45 X |
| 4,967,621 | 11/1990 | Soga et al. | 477/45 X |
| 5,157,992 | 10/1992 | Hayashi et al. | 477/45 X |

FOREIGN PATENT DOCUMENTS

| | | |
|---|---|---|
| 62-31533 | 2/1987 | Japan . |
| 63-57343 | 3/1988 | Japan . |

*Primary Examiner*—Khoi Q. Ta
*Attorney, Agent, or Firm*—Martin A. Farber

[57] ABSTRACT

An electronically controlled hydraulic apparatus for a belt drive type continuously variable transmission comprises a belt wound around a primary pulley and a secondary pulley, a line pressure control valve for controlling a line pressure of a secondary cylinder, a shift control valve for controlling a primary pressure of a primary cylinder. The shift control valve includes a pilot valve for generating a pilot pressure according to a solenoid current, a spool with a step and a valve body. The pilot pressure is applied to one end of the spool and the primary pressure feedbacked and a spring force are applied to the other end so as to control the primary pressure on the balance of the spool in the valve body. The step ratio of the spool is designed so as to be 1.11 to 1.5 and further the shift control valve is constituted such that the pilot pressure becomes near zero when the primary pressure is zero.

2 Claims, 5 Drawing Sheets

HYDRAULIC CONTROL APPARATUS FOR CONTINUOUSLY VARIABLE TRANSMISSION

BACKGROUND OF THE INVENTION

1. Field of the Invention

The present invention relates to an electronically controlled hydraulic control apparatus for a belt-and pulley type continuously variable transmission of an automobile and particularly to a structure of a pilot operative current control type shift control valve thereof.

2. Prior Arts

Generally, the continuously variable transmission of this type has two hydraulic pressure control valves, i.e., a line pressure control valve for clamping a belt by controlling line pressure of a secondary pulley and a shift control valve for changing a speed by controlling primary pressure of a primary pulley. The shift control valve is a current-operated hydraulic control valve for controlling primary pressure according to engine and vehicle operating conditions by miscellaneous input signals such as engine speed, throttle opening angle, vehicle speed and the like. That is to say, the control unit calculates a target primary pressure by electrically processing these input signals and supplies a solenoid current corresponding to the target primary pressure to the shift control valve to control the primary pressure.

There are a direct operative type and a pilot type in the abovementioned current operative type control valve. The direct operative type is directly operated by solenoid current and the pilot type is operated by pilot pressure which is generated according to solenoid current. The pilot type has an advantage of that high primary pressure can be controlled with stability by small solenoid current, however, on the other hand, it has a disadvantage of that since line pressure is used at the pilot valve independently for different purposes, the amount of oil consumption at the pilot valve is increased and as a result an oil pump with a larger discharge capacity is needed, Concerning the current-operative type shift control valve for the continuously variable transmission, as an example of the direct operative type, Japanese Unexamined Patent Application Toku-Kai-Sho 62-31535 discloses a technique of a pressure feedback type solenoid valve whose spool is directly operated by a moving yoke of an electromagnetic coil. For an example of the pilot type, Japanese Unexamined Patent Application Toku-Kai-Sho 63-57343 presents a pilot type control valve comprising reference pressure generating means for reference pressure based on duty control signals and a hydraulic control means for hydraulically controlling according to reference pressure and feedback pressure, However, the prior art of Toku-Kai-Sho 62-31533 has a defect that disturbances of hydraulic pressure and the like make the valve operation unstable because of the feature of the direct operative type valve, i.e., its weak electromagnetic force. In order to compensate this defect, it is necessary to strengthen the electromagnetic force of the valve but this incurs an up-sizing of the solenoid which leads to disadvantages in weight, space utility and manufacturing cost. The other prior art of Toku-Kai-Sho 63-57343 is advantageous to the effect of disturbances because of the pilot type. However, in this prior art, it is necessary to establish the reference pressure at a lower level than the lowest level of the estimated line pressure. This produces a big difference between the line pressure and the reference pressure when the line pressure is high in such a case as the pulley ratio is at a "low" position and as a result of this oil consumption is increased. Further, in this type of the control valve, since the primary control valve has a straight-shape, there is a limit in the control range of primary pressure. Consequently, in order to raise the primary pressure to high enough, the pressure area of the primary cylinder must be increased and this incurs an up-sizing and a weight increase of the cylinder.

SUMMARY OF THE INVENTION

In view of these situations mentioned above, the present invention is intended to obviate the disadvantages and defects of the prior arts and it is an object of the present invention to obtain a control valve capable of saving oil consumption and stabilizing oil pressure in the hydraulic system.

In order to achieve this object, the control system for a belt-and -pulley type continuously variable transmission of a motor vehicle, having a hydraulic pump for generating a line pressure, a primary pulley connected to an engine, a secondary pulley connected to wheels, a belt wound around the primary pulley and the secondary pulley for transmitting torque from the primary pulley to the secondary pulley, a primary cylinder coaxially provided with the primary pulley for varying the diameter of the primary pulley, a secondary cylinder coaxially provided with the secondary pulley for varying the diameter of the secondary pulley according to the line pressure and a control unit for outputting a first solenoid current and a second solenoid current, comprises: a secondary control valve provided for controlling said line pressure and for regulating a clamping force of the secondary pulley; the secondary control valve comprising a solenoid type pilot valve operated by a second pilot pressure controlled by the second solenoid current; a primary control valve for converting the line pressure into a primary pressure, for controlling the line pressure and for supplying the primary pressure to the primary cylinder; and the primary control valve comprising a solenoid type pilot valve operated by a first pilot pressure controlled by the first solenoid current, a spool having a step ratio of 1.11 to 1.5 and is constituted such that the pilot pressure is established near zero when the primary pressure is zero.

BRIEF DESCRIPTION OF THE DRAWINGS

A specific embodiment of the present invention will be described with reference to the accompanying drawings, in which.

DETAILED DESCRIPTION OF THE INVENTION

Figure 1:
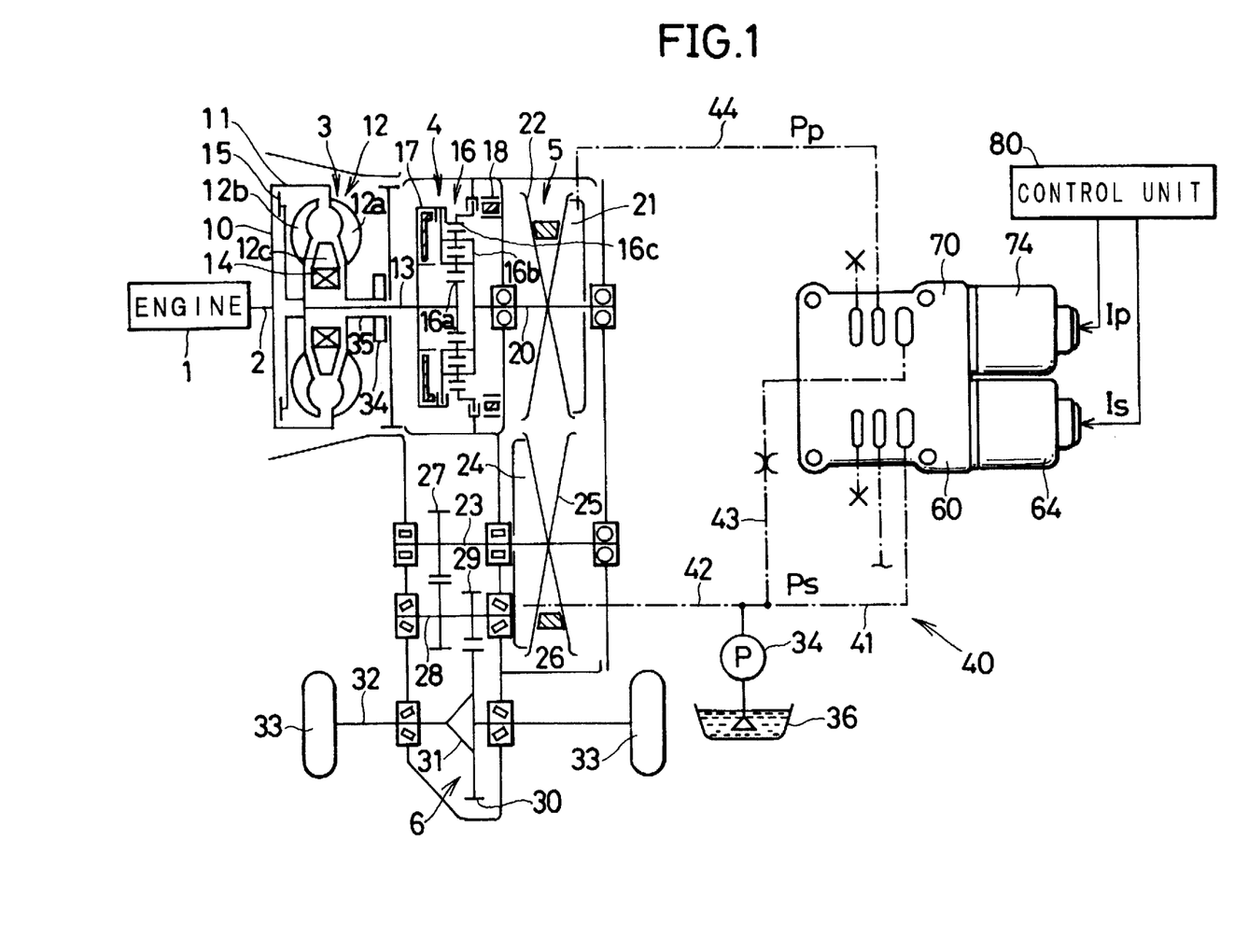
FIG. 1 is a schematic view showing a continuously variable transmission and a control apparatus thereof.

Referring now to FIG. 1, numeral 1 denotes an engine whose torque is transmitted from a crank shaft 2 to a differential apparatus 6 through a torque converter 12, a forward-and-backward gear changeover apparatus 4 and a belt-and-pulley type continuously variable transmission 5.

In the torque converter 3, the crank shaft 2 is connected with a converter cover 11 and a pump impeller 12a of the torque converter 12 through a drive plate 10. A turbine runner 12b of the torque converter 12 is connected with a turbine shaft 13 and a stator 12c is guided by a one-way clutch 14. A lock-up clutch 15 integrally connected with the turbine runner 12b is provided such that it is engaged or disengaged with the drive plate 10. Thus, an engine torque is transmitted to the turbine shaft 13 through the torque converter 12 or the lock-up clutch 15.

The forward-and-backward gear changeover apparatus includes a double-pinion type planetary gear 16 in which a sun gear 16a is connected with the turbine shaft 13 and a carrier 16b is connected with a primary shaft 20. A forward clutch 17 is provided between the sun gear 16a and a ring gear 16c and a reverse brake 18 is disposed between the ring gear 16c and a case respectively. A forward position is obtained by integrally connecting the planetary gear 16 for directly connecting the turbine shaft 13 with the primary shaft 20 by engaging the forward clutch 17, a backward position is given by engaging the reverse brake 18 for outputting a reverse rotation to the primary shaft 20 and a neutral position is accomplished by disengaging the forward clutch 17 and the reverse brake 18 for giving a free rotation to the planetary-gear 16.

The belt-and-pulley type continuously variable transmission 5 is composed of the primary shaft 20 and a secondary shaft 23 which is disposed in parallel with the primary shaft 20. The primary shaft 20 has a primary pulley 22 whose groove width can be changed freely by the movement of the primary cylinder 21. The secondary shaft 23 has a similar secondary pulley 25 which is freely moved by a secondary cylinder 24. Between the both pulleys 22 and 25, a drive belt 26 is wound so as to transmit torque from the primary shaft 20 to the secondary shaft 23 and so as to change speed of the secondary shaft 23 continuously by changing a ratio of the winding radius of the both pulleys 22 and 25.

In the differential apparatus 6, an output shaft 28 is connected with the secondary shaft 23 through a pair of reduction gears 27 and a drive gear 29 of the output shaft 28 is meshed with a final gear 30. The differential apparatus 31 integrally fixed to the final gear 30 is connected with a left and right wheels 33 through an axle shaft 32 so as to drive a vehicle.

With respect to a hydraulic control system, a variable displacement type hydraulic pump 34 is disposed adjacent to the torque converter 12 and since it is coupled with a pump drive shaft 35 which is connected with the converter cover 11, the hydraulic pump 34 is always driven by the engine 1 to supply oil from an oil pan 36 for feeding hydraulic pressure to an electronically controlled hydraulic control apparatus 40.

The electronically controlled hydraulic control apparatus 40 includes a line pressure control valve 60 and a shift control valve 70. In the line pressure control valve 60, the discharge pressure from the hydraulic pump 34 is guided to the line pressure control valve 60 through an oil passage 41 and regulated therein by solenoid current Is which is controlled by a control unit 80. The regulated line pressure Ps is always supplied to the secondary cylinder 24 through an oil passage 42 to clamp the belt. On the other hand, the line pressure Ps is guided to the shift control valve 70 through an oil passage 43. In the shift control valve 70, the line pressure Ps is reduced by solenoid current Ip which is controlled by the control unit 80 to produce a line pressure Pp. The line pressure Pp is supplied to the primary cylinder 21 through an oil passage 44 to make a shift control.

In the control unit 80, miscellaneous input signals such as a throttle opening angle, an engine speed, a primary shaft speed, a secondary shaft speed corresponding to the vehicle speed, a line pressure Ps and the like, are subjected to electronic processes. Further, in the control unit 80, a target line pressure and a target primary pressure are calculated according to the engine and vehicle operating conditions. The target line pressure is converted into a solenoid current Is, which is outputted to the line pressure control valve 60 to control the line pressure electronically. The target primary pressure is converted into a solenoid current Ip and the solenoid current Ip is outputted to the shift control valve 70 to control the primary pressure electronically.

Figure 2:
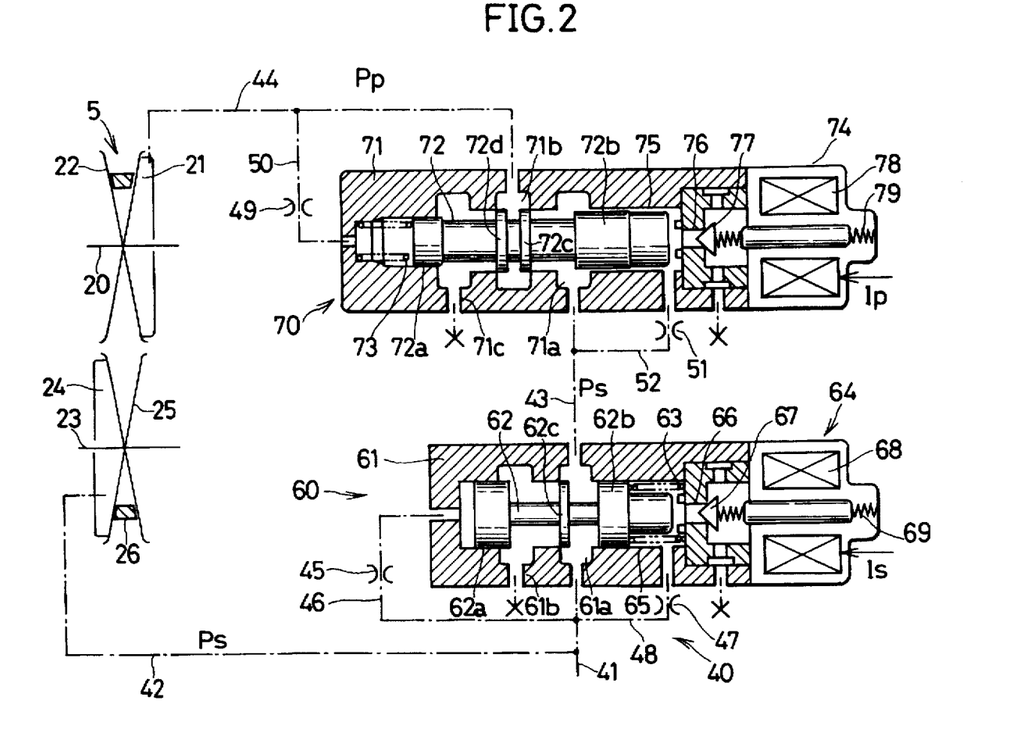
FIG. 2 is a hydraulic circuit diagram of a control system for a continuously variable transmission.

Next, referring to FIG. 2, the construction of the line pressure control valve 60 and the shift control valve 70 will be described.

The line pressure control valve 60 belongs to a proportional solenoid relief valve of a pilot operated pressure feedback type, in which a straight-shaped spool 62 having a uniform land diameter is inserted in a valve body 61. The line pressure Ps is applied as a feedback pressure to a land 62a on one side of the spool 62 through an oil passage 46 having an orifice 45. A land 62b on the other side of the spool 62 is subjected to the spring force of a spring 63 for retaining a minimum pressure and at the same time to the pilot pressure Pc controlled by a pilot valve 64. An intermediate land 62c acts as balancing the both lands 62a and 62b by means of draining a part of oil pressure passing a port 61a from, a drain port 61b. In this state, where S1 is a pressure area of the spool 62, Ps is a line pressure, Pc is a pilot pressure and Fsp is a spring force, the following formula is obtained:

$$Ps \cdot S1 = Pc \cdot S1 + Fsp$$

From this formula, it is understood that the line pressure Ps is controlled in the proportional relationship with the pilot pressure Pc.

The pilot valve 64 has a pilot chamber 65 to which the line pressure Ps is supplied from an oil passage 48 having an orifice 47. The pilot chamber 65 is communicated with a port 66 which is closed by a popper valve 67 for generating the pilot pressure Pc. The popper valve 67 is connected with a solenoid 68 through a biasing spring. The solenoid 68 is a pull-in coil type which is biased by a return spring 69 so as to close the port 66. Consequently, when the solenoid 68 is not energized, the port 66 is fully closed by the popper valve 67 and the pilot pressure Pc becomes maximum. When the solenoid current Is increases, the popper valve 67 is pulled in the solenoid direction so as to open the port 66 and as a result the pilot pressure Pc is reduced. Thus, the pilot pressure Pc is reduced with an increase of the solenoid current Is.

Figure 3A:
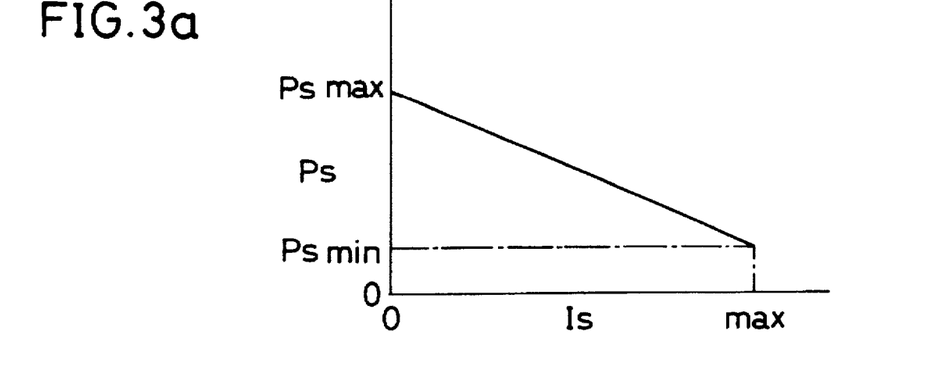
FIG. 3a is a diagram showing a relationship between a line pressure and a solenoid current.

Therefore, the line pressure Ps has an inversely proportional relationship with the solenoid current Is, as shown in FIG. 3a. What is easily understood from this relationship is that the line pressure Ps becomes maximum when the solenoid current Is is zero. That is to say, this produces a fail safe function that the belt is prevented from causing a slip when a wire in the electrical system is broken for example. Furthermore, this enables the diameter of the orifice 47 to be small so as to reduce oil consumption.

Generally, the line pressure Ps is required to be higher as transmission torque becomes large and the speed ratio comes near to a low position. Further, the control range of the line pressure Ps is required to be large since the vehicle has miscellaneous operating conditions. Therefore, the line pressure Ps is controlled so as to high and wide at the maximum speed ratio low and so as to be low and narrow at the minimum speed ratio OD (over-drive), as illustrated in FIG. 3c. Here, the maximum value Psmax of the line pressure Ps is determined such that a slip does not occur in the belt even when the torque converter 12 is in the stall condition and the minimum value Psmin is determined as low as possible such that a necessary torque can be transmitted when the vehicle is operated in the OD position. In either case, the line pressure Ps is prevented from becoming higher than necessary from the viewpoint of energy loss.

The shift control valve 70 belongs to a proportional solenoid pressure reducing valve of a pilot operated pressure feedback type. A stepped spool 72 is inserted in the valve body 71. The spool consists of a land 72a with a small diameter, three lands 72b, 72c and 72d with a large diameter. One intermediate land 72c is provided between a port 71b connected with an oil pass 44 and a port 71a connected with an oil pass 43 and the other intermediate land 72d is provided between the port 71b and a drain port 71c. The land 72a of the spool 72 is subjected to the primary pressure Pp as a feedback pressure through an oil pass 50 having an orifice 49 and is biased by a spring 73 so as to hold the primary pressure Pp zero. The land 72b with a larger diameter is subjected to the pilot pressure Pc controlled by the pilot valve 74. The ratio of the spool diameter (step ratio of the spool) and the spring load are determined so as to satisfy the relationship Pp=Ps when Ps≦Ppmax.

The primary pressure Pp is increased when the line pressure Ps is supplied to the primary cylinder 21 through the land 72c and is decreased when the primary pressure Pp is drained through the land 72d. The primary pressure Pp is controlled on the balance of the above both conditions. Where S1 is a pressure area of the land 72a; S2 is a pressure area of the land 72b, Pp is a primary pressure; Pc is a pilot pressure; and Fsp is a spring force, the following formula is obtained:

$$Pp \cdot S1 + Fsp = Pc \cdot S2 \tag{1}$$

By this formula, it can be seen that the primary pressure Pp is controlled in the proportional relationship with the pilot pressure Pc in the same manner as in the case of the line pressure Ps.

A pilot valve 74 functions in the same way as that of the line pressure control valve 60. That is to say, The pilot valve 74 has a pilot chamber 75 to which the line pressure Ps is supplied from an oil passage 52 having an orifice 51. The pilot chamber 75 is communicated with a port 76 which is closed by a popper valve 77 for generating the pilot pressure Pc. The popper valve 77 is connected with a solenoid 78 through a biasing spring. The solenoid 78 is a pull-in coil type which is biased by a return spring 79 so as to close the port 76. Consequently, when the solenoid 78 is not energized, the port 76 is fully closed by the poppet valve 77 and the pilot pressure Pc becomes maximum. When the solenoid current Ip increases, the popper valve 77 is pulled in the solenoid direction so as to open the port 76 and as a result the pilot pressure Pc is reduced. Thus, the pilot pressure Pc is reduced with an increase of the solenoid current.

Figure 3B:
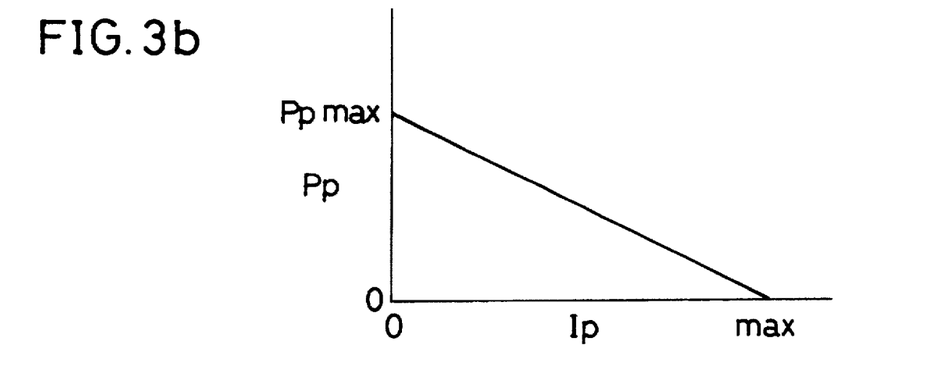
FIG. 3b is a diagram showing a relationship between a primary pressure and a solenoid current.
Figure 3C:
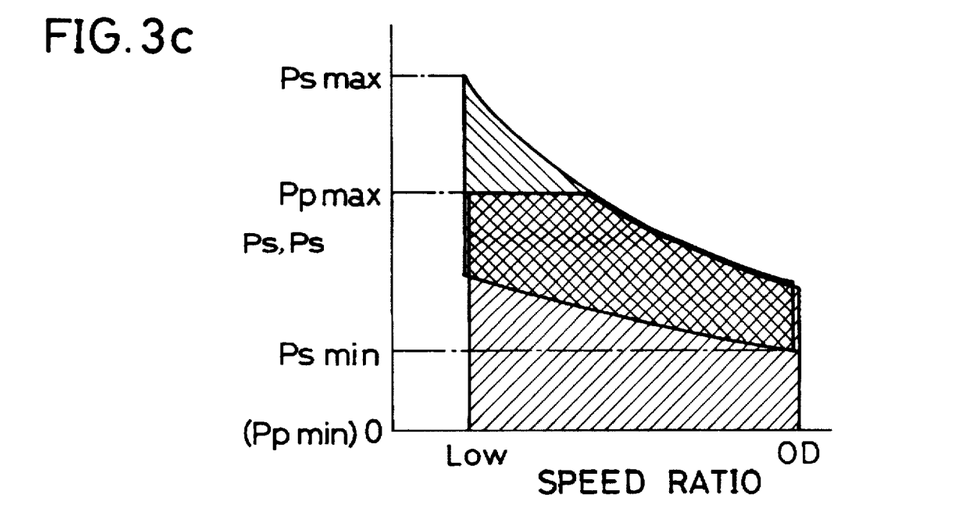
FIG. 3c is a diagram showing characteristics of a primary pressure and a line pressure.

Hence, the primary pressure Pp is in the inversely proportional relationship with the solenoid current Ip as illustrated in FIG. 3b. Consequently, when a wire in the electrical system is broken and the solenoid valve 78 deenergized, the primary pressure becomes maximum, thereby a sudden down-shift during running can be avoided. That is, this mechanism serves as a fail-safe function.

Next, the control range of the primary pressure Pp will be described.

Figure 4A:
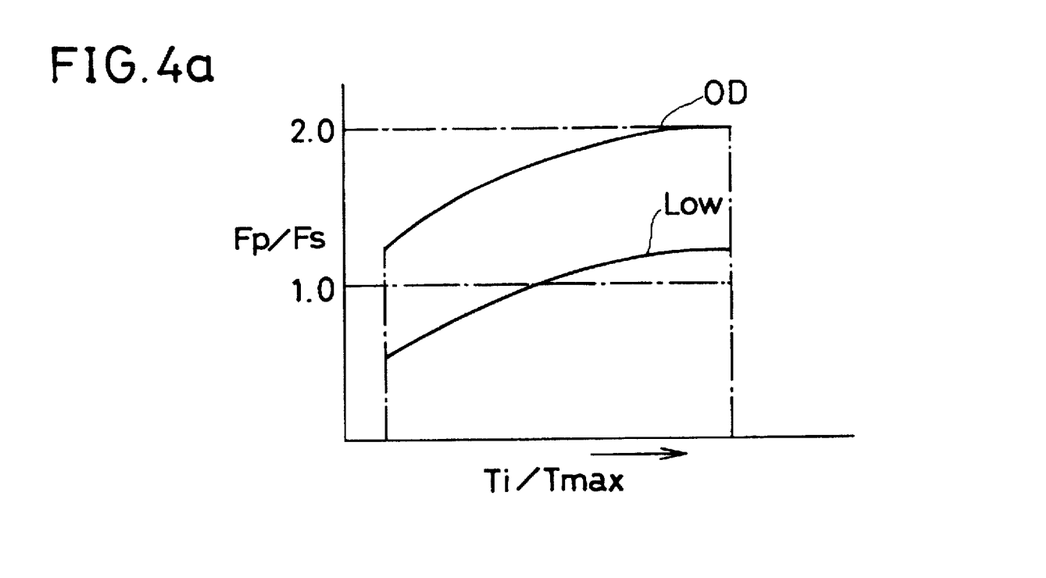
FIG. 4a is a diagram showing a relationship between a clamping force and a torque ratio.
Figure 4B:
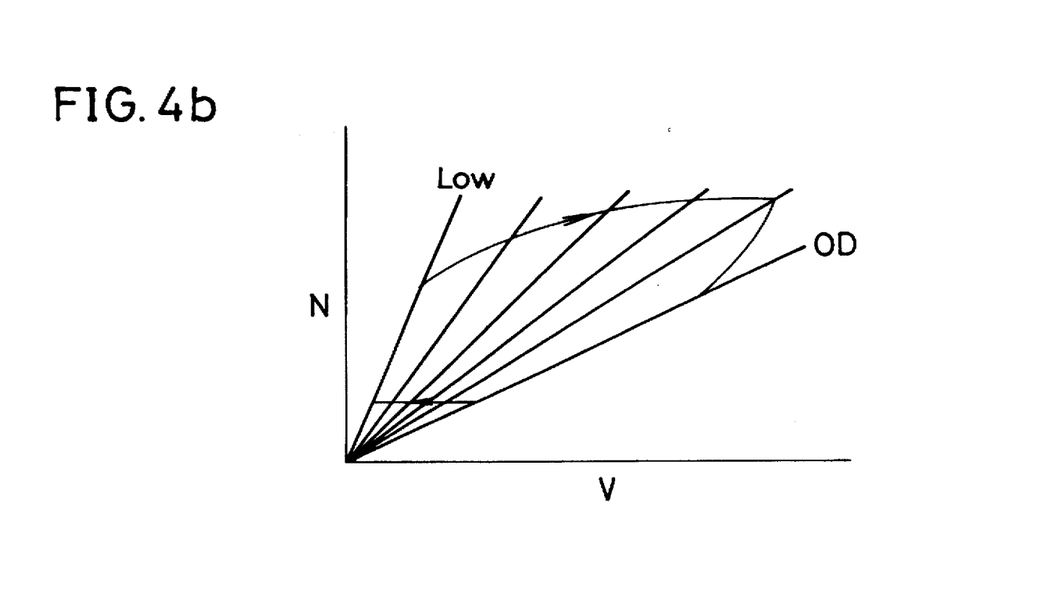
FIG. 4b is a diagram showing a shift characteristic of a continuously variable transmission.

In the continuously variable transmission using a push type belt, where Fp is a primary clamp force (a multiplication of the primary pressure Pp and the cylinder area Ap); Fs is a secondary clamp force (a multiplication of the line pressure Ps and the cylinder area Ap); Ti is an input torque; and Tmax is a transmittable torque at a given speed ratio and with a given hydraulic pressure, there is a relationship as shown in FIG. 4a between a clamp force ratio Fp/Fs and a torque ratio Ti/Tmax. According to this relationship, when the transmission torque increases with the line pressure Ps and the primary pressure Pp kept constant, the speed ratio moves towards the low side. Further, when the primary pressure Pp is reduced with the transmission torque and the line pressure Ps kept constant, the speed ratio shifts towards the low side. Therefore, when the vehicle driver makes a kickdown, it is possible to shift the speed ratio down to the low position quickly by reducing the primary pressure Pp to the minimum value Ppmin (in this case Ppmin=0).

As indicated in FIG. 4a, since there is a region of the clamp force ratio Fp/Fs>1, generally the cylinder area Ap is designed to be larger than the cylinder area As. However, in consideration of the inertia moment of the primary cylinder, it is desirable to reduce the diameter of the primary cylinder as much as possible. To compensate this, it is necessary to raise the primary pressure Pp. Generally, the maximum primary pressure Ppmax is determined so as to be the same level as the line pressure Ps. Thus, the primary pressure Pp is controlled within a range of 0 to Ps.

Next, the construction for reducing oil consumption in the pilot valve 74 will be described.

First, it is necessary to meet two conditions Pp=0 and Pp=Ps (Ps≦Ppmax).

The abovementioned formula (1) is deformed as follows:

$$Pp + Fsp/S1 = Pc \cdot S2/S1 \tag{2}$$

Where α is a step ratio S2/S1 and β=Fsp/S1, following formula is obtained:

$$Pp + \beta = Pc \cdot \alpha \tag{3}$$

Where Pc1 is a pilot pressure in case of Pp=0, Pc1 is equal to β/α. Further, the Pc1 may be established at zero or at a value near zero. Generally, in case of most electromagnetic operated valves "dither" is applied so as to obtain a quick response to current. If the Pc1 is equal to zero, "dither" can not be applied and therefore a response characteristic is degraded. Hence, it is needed that the Pc1 is established so as to maintain a minimum pressure capable of ensuring "dither effect". Practically, it is desirable that the Pc1 is established at a value more than 0.1 Mpa (Megapascal). Here, when Pc1 is let to be 0.1, a formula 0.1 α=β is obtained.

In case where the speed ratio is minimum, i.e., the speed ratio is overdrive (OD), it is necessary that the relationship Pp=Ps is satisfied. Substituting this into the formula (3), $$Psmin + \beta = Psmin \cdot \alpha \tag{4}$$

Further, substituting the relationship 0.1 α=β into (4), $$Psmin\ (\alpha - 1) = 0.1\alpha \tag{5}$$

Here, the minimum line pressure Psmin needed for torque transmission has a permissible lower level due to a pressure rise caused by the flow resistance of the drain passage. The practicable pressure level of the Psmin ranges from 0.3 to 1.0 Mpa, depending on the capacity of the continuously variable transmission. Substituting these values into (5), $\alpha=1.5$ when Psmin=0.3 and $\alpha=1.11$ when Psmin=1.0. That is to say, the step-ratio $\alpha$ is determined within a range of $\alpha=1.11$ to 1.5. On the other hand, The relationship between the spring force Fsp and the pressure area S2 of the land 72$b$ is expressed as Fsp=0.1·S2 from the above formula $0.1\alpha=\beta$.

The flow quantity q of oil consumed in the pilot valve 74 is expressed as:

$$q=Cd \cdot A \sqrt{2(Ps-Pc)/\rho}$$

where Cd is a flow coefficient; A is an area of the orifice; and $\rho$ is oil density.

Figure 5:
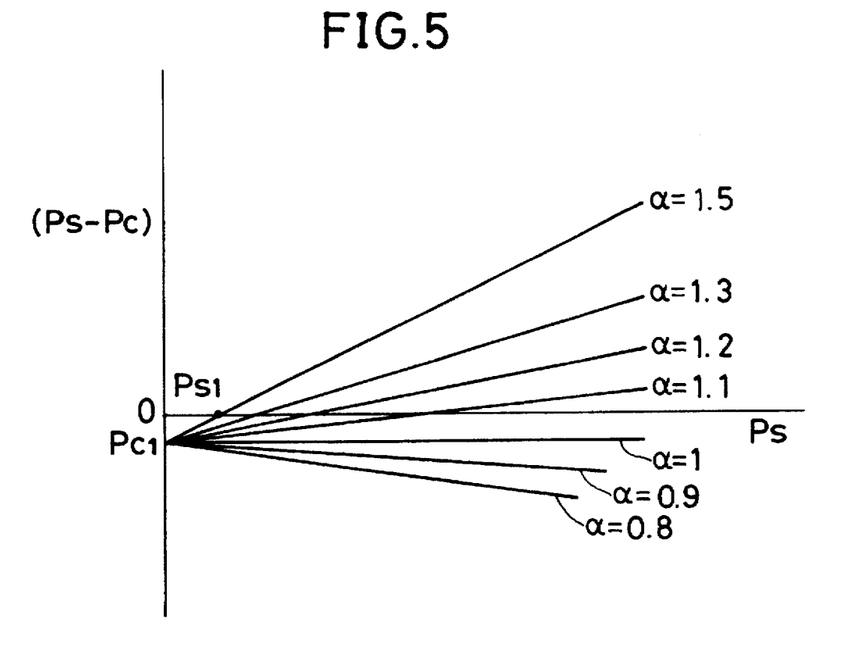
FIG. 5 is a diagram showing a relationship between a line pressure and a pressure difference of a line pressure and a pilot pressure.

Since the frequency distribution of the speed ratio in normal operating conditions mostly lies in the operating range near the overdrive according to the shift chart of the continuously variable transmission, the pressure difference Ps–Pc must be minimized under the condition Pp=Ps in order to reduce the oil consumption q. Substituting Pp=Ps into (3), the expression Pc=Ps/$\alpha$+$\beta$/$\alpha$ is obtained. Thus, the relationship between the pressure difference Ps–Pc and the Ps is expressed in those lines parameterizing $\alpha$, as illustrated in FIG. 5.

The region Ps–Pc<0 is an area wherein the relationship Pp=Ps can not be achieved because the line pressure Ps is too low. From this chart, if $\alpha$ is taken from the neighborhood of 1.1, it is known that the pressure difference Ps–Pc can be reduced with respect to the overall Ps. On the other hand, if $\alpha$ is chosen from the neighborhood of 1.5, it is also known that the minimal operating pressure Ps1 of the line pressure Ps can be minimized. Consequently, if such $\alpha$ as Ps–Pc is equal to 0 at Psmin is chosen within a range of 1.11 to 1.50, the overall pressure difference Ps–Pc can be minimized.

In this embodiment, an example of Pc1=0.1 Mpa has been described. Generally, the value Pc1 varies according to oil specifications, a construction of hydraulic circuit, a permissible level of leakage and the like. It is needless to say that the Pc1 can be taken arbitrarily under the condition Pc1$\geq$0.1 Mpa.

Next, the function of the system according to this embodiment will be described.

First, a discharge pressure is generated by the oil pump 34 which is driven by the engine 1 through the converter cover 11 of the torque converter 12 and the rear drive shaft 35. The discharge pressure of the oil pump 34 is supplied to the electronically controlled hydraulic control apparatus 40 and is regulated by the line pressure control valve 60. The regulated line pressure Ps is introduced into the pilot valves 64, 74 wherein the pilot pressure Pc is generated. The line pressure control valve 60 is operated so as to balance the spring force Fsp with the line pressure Ps and the shift control valve 70 is operated so as to balance the pilot pressure Pc with the primary pressure Pp and with the spring force Fsp.

When the vehicle is in standstill, the maximum solenoid current Ip flows through the solenoid 78 of the shift control valve 70 and as a result the pilot pressure Pc becomes approximately zero. Then, the spring 73 pushes the spool 72 to drain oil and thus the primary pressure Pp becomes zero. Further, in the line pressure control valve 60, the relatively low solenoid current Is flows through the solenoid 68 and as a result the pilot pressure Pc becomes low. At this time, the line pressure Ps is controlled to be low. Because the line pressure Ps is supplied only to the secondary cylinder 24, the belt 26 of the continuously variable transmission 5 shifts to the secondary pulley 25, thereby the transmission is set to the low position having the maximum speed ratio.

When the shift lever is shifted to the drive range at the vehicle stating, the forward clutch 17 of the forward and backward changeover apparatus 4 is engaged to the forward position. Torque of the engine 1 transmitted to the torque converter 12 is inputted to the primary shaft 20 through the forward and backward changeover apparatus 4. Then, the power with the largest speed ratio of low is transmitted to the secondary shaft 23 through the primary pulley 22, the belt 26 and the secondary pulley 25 and then it is transmitted to the wheels 33 through the differential 6. Thus, the vehicle starts to run.

When the transmission torque of the transmission 5 is large, the solenoid current Is of the line pressure control valve 60 is reduced. Then, the pilot pressure Pc, therefore, the line pressure Ps is controlled in high. Thus, the belt 26 is clamped by the clamp force of the secondary cylinder 24, whereby the belt slipping due to the strong transmission torque can be prevented. On the other hand, when the vehicle runs at the low speed with the OD position, the pilot pressure Pc becomes approximately zero due to the largest solenoid current Is and consequently the line pressure Ps is maintained at the minimum value Psmin.

When the vehicle starts to shift with an increase of the vehicle speed, the solenoid current Ip of the shift control valve 70 is gradually decreased to raise the pilot pressure Pc, therefore, the primary pressure Pp also rises gradually-from zero. The clamp force by the primary cylinder 21 is applied to the belt 26 in the upshift direction and the speed ratio of the transmission is swiftly shifted to the minimum speed ratio OD. Thus, the vehicle can run economically over the wide speed range. On the other hand, for example, when the vehicle speed goes down below a predetermined speed, inversely, the solenoid current Ip of the shift control valve 70 is gradually increased to reduce the pilot pressure Pc and at the same time the primary pressure Pp and the belt 26 is moved again to the secondary pulley 25, that is, the belt 26 is moved towards the low position or the vehicle is downshifted. Thus, the speed ratio of the vehicle is changed between low and OD continuously. Further, at kickdown the primary pressure Pp is instantly reduced to zero for obtaining a quick downshifting to the low position.

Further, in the shift control valve 70, setting the pilot pressure Pc1 when Pp=0 to 0.1 Mpa, for example, in consideration of the practical use, the load of the spring 73 is established at such a small value as 0.1·S2. Further, the step ratio $\alpha$ of the spool 72 is established at such a value as 1.11 to 1.5 which is larger than and near to 1. In case of Ps$\leq$Ppmax, the pilot pressure Pc is controlled at the high level which coincides with the line pressure Ps. Further, in case of Psmin and when the speed ratio is at OD, the primary pressure Pp becomes equal to the line pressure Ps and consequently the area Ap of the primary cylinder 21 can be reduced for making the inertia moment small.

Furthermore, as known clearly in FIG. 5, in case of Pp=Ps and when the speed ratio is at the minimum value, i.e., OD position, the pressure difference Ps–Pc becomes very small according to the step ratio $\alpha$. Consequently, the oil consumption q of the pilot valve 74 can be saved.

In summary, as described above, according to the embodiment of the present invention, since the shift control valve is constituted such that the pilot pressure is established at a value near zero in case where the primary pressure is zero and the step ratio is determined at a value ranging from 1.11 to 1.5, the primary pressure can be controlled securedly ranging from zero to a pressure level coinciding with the line pressure, whereby the area of the primary cylinder being able to be decreased to reduce the inertia moment.

Further, the oil consumption at the pilot valve 18 of the shift control valve can be saved at the minimum speed ratio which is most frequently used. This enables a smaller capacity of the oil pump or a reduction of the power loss therein. Furthermore, the difference between the pilot pressure and the primary pressure is controlled in the low level, the oil leakage from the pilot valve can be reduced and consequently the hydraulic pressure of the system can be stabilized.

While the presently preferred embodiment of the present invention has been shown and described, it is to be understood that this disclosure are for the purpose of illustration and that various changes and modifications may be made without departing from the scope of the invention as set forth in the appended claims.

What is claimed is:

1. An electronically controlled hydraulic apparatus for a belt-and -pulley type continuously variable transmission of a motor vehicle, having a hydraulic pump for generating a line pressure, a primary pulley connected to an engine, a secondary pulley connected to wheels, a belt wound around said primary pulley and said secondary pulley for transmitting torque from said primary pulley to said secondary pulley, a primary cylinder coaxially provided with said primary pulley for varying the diameter of said primary pulley, a secondary cylinder coaxially provided with said secondary pulley for varying the diameter of said secondary pulley according to said line pressure and a control unit for outputting a first solenoid current and a second solenoid current, comprising:

a secondary control valve for controlling said line pressure and for regulating a clamping force of said secondary pulley;

a primary control valve having a pilot valve for converting said line pressure into a primary pressure and for supplying said primary pressure to said primary cylinder; and said primary control valve comprises a solenoid type pilot valve operated by a first pilot pressure which is controlled according to said first solenoid current, a spool having a step ratio of 1.11 to 1.5 and is constituted such that said pilot pressure is established near zero when said primary pressure is zero.

2. The electronically controlled hydraulic control apparatus according to claim 1, wherein said solenoid type pilot valve of is operated in proportion to said solenoid current.

* * * * *